United States Patent [19]

Moore

[11] 3,866,154

[45] Feb. 11, 1975

[54] BROADBAND UNIDIRECTIONAL SURFACE WAVE TRANSDUCER

[75] Inventor: Robert A. Moore, Arnold, Md.

[73] Assignee: Westinghouse Electric Corporation, Pittsburgh, Pa.

[22] Filed: Dec. 3, 1973

[21] Appl. No.: 421,585

[52] U.S. Cl. .................... 333/30 R, 310/9.8, 333/72

[51] Int. Cl. ........ H03h 9/02, H03h 9/26, H03h 9/30

[58] Field of Search ............... 333/30 R, 72; 310/9.8

[56] References Cited

UNITED STATES PATENTS

| | | | |
|---|---|---|---|
| 3,675,052 | 7/1972 | Lindsay et al. | 333/30 X |
| 3,800,248 | 3/1974 | Speiser et al. | 333/30 R |

OTHER PUBLICATIONS

White et al.; "Direct Piezoelectric Coupling to Surface Elastic Waves" in Applied Physics Letters, Vol. 7, No. 12, Dec. 15, 1965, pp. 314–316.

Kino et al.; "Acoustic Surface Waves" in Scientific American, Vol. 227, No. 4, Oct. 1972, pp. 51–53.

*Primary Examiner*—Archie R. Borchelt
*Assistant Examiner*—Marvin Nussbaum
*Attorney, Agent, or Firm*—D. Schron

[57] ABSTRACT

The disclosure relates to a novel broadband surface wave acoustic transducer having unidirectional transduction characteristics and to surface wave acoustic devices employing the broadband unidirectional transducer. In the preferred embodiment, the transducer comprises an interdigital electrode arrangement having an electrically conductive common strip meandering through the interdigital spaces of the electrode arrangement. The interdigitally arranged electrodes are spaced in accordance with a repeating series $(n + 1/4)\lambda$, $(n + 3/4)\lambda$, $(n + 1/4)\lambda$, $(n + 3/4)\lambda$ . . . , where n is an integer and $\lambda$ is an acoustic wavelength. The meandering strip provides a common terminal for the interdigital electrodes so that signals 90° out of phase may be applied between the electrodes and the common terminal.

10 Claims, 5 Drawing Figures

BROADBAND UNIDIRECTIONAL SURFACE WAVE TRANSDUCER

BACKGROUND OF THE INVENTION

1. Field of the Invention

The present invention relates to surface wave acoustic devices and, in particular, to a broadband surface wave acoustic transducer having unidirectional transduction characteristics and surface wave acoustic devices such as surface wave acoustic delay lines and filters employing broadband unidirection transducers.

2. State of the Prior Art

Surface wave acoustic devices have become exceedingly useful in the VHF/UHF frequency range and are becoming useful in the microwave frequency range as well. Surface wave acoustic devices are particularly useful in these frequency ranges for signal filtering in that desirable characteristics such as exceedingly sharp selectivity skirts, a flat top response, low dispersion and reproductibility in quantity production are achievable with surface wave acoustic filters whereas other types of filters may not provide these desirable qualities.

While the flexibility of design and admissibility to desired design characteristics enhance the utility of surface wave acoustic devices for filtering applications, it has been very difficult to achieve low insertion losses in known surface wave acoustic filters. One of the main difficulties in achieving a desirably low insertion loss in surface wave acoustic filters results from the bi-directional characteristics of available surface wave transducers. For example, one type of interdigital surface wave transducer employed in filter design employs generally symmetrical interdigital finger spacing and by virtue of the symmetry, energy coupled through the transducer from a signal source propagates equally in both directions. This bi-directional characteristic results in a three decibel (3 dB) loss at the input transducer and, by virtue of receprocity, an equivalent 3 dB loss at the output transducer. The bi-directional characteristics of the interdigital transducers in a surface wave acoustic filter thus adds a 6 dB loss to whatever additional source of loss may exist.

This 6 dB loss may be avoided through the use of unidirectional transducers in the surface wave acoustic filter. However, presently available unidirectional transducers are considerably limited in bandwidth. Because of the relatively narrow bandwidth limitations of known unidirectional transducers, the avoidance of the 6 dB insertion loss is of no practical significance in most applications of surface wave transducers.

OBJECTS AND SUMMARY OF THE INVENTION

It is accordingly an object of the present invention to provide a novel unidirectional surface wave transducer.

It is another object of the present invention to provide a novel unidirectional surface wave transducer which avoids the insertion loss attributable to the bi-directional characteristics of known transducers and is suitable for broadband applications.

It is a further object of the present invention to provide broadband acoustic delay line and filter configurations employing a novel unidirectional surface wave transducer according to the present invention.

These and other objects of the present invention are accomplished in accordance with the present invention through the provision of a novel broadband, unidirectional surface wave transducer comprising an interdigital electrode arrangement formed on an acoustic wave material and having an electrically conductive strip meandering through the interdigital spaces of the electrode arrangement. The electrode arrangement preferably comprises two interdigitally arranged electrodes having an interdigital spacing defined by a repeating series $(n + 1/4)\lambda$, $(n + 3/4)\lambda$, $(n + 1/4)\lambda$, $(n + 3/4)\lambda$. . . , where $n$ is an integer and $\lambda$ is an acoustic wavelength The electrically conductive meandering strip provides a common terminal for each electrode so that signals 90° out of phase may be applied between the electrodes and the common terminal.

DETAILED DESCRIPTION

Figure 1:
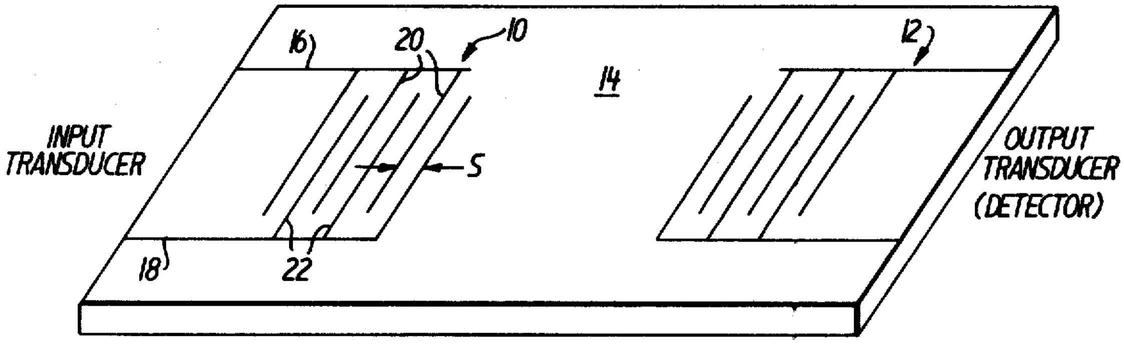
FIG. 1 (PRIOR ART)
FIG. 1 is a pictorial representation of a prior art surface wave acoustic device employing bi-directional transducers.

FIG. 1 illustrates a typical acoustic wave device employing prior art surface wave transducers of the type illustrated and described in U.S. Pat. No. 3,611,203 to H. W. Cooper and R. A. Moore. As is illustrated in FIG. 1, first and second interdigital transducers 10 and 12 may be formed in spaced relation on an elongated, planar substrate 14 of a suitable acoustic wave material to provide a surface wave acoustic delay line or filter. Suitable substrate materials and ways of forming the transducers are disclosed in the above-referenced patent.

Each of the interdigital transducers of the type illustrated in FIG. 1 typically comprises first and second interdigitally arranged electrodes 16 and 18 formed on the surface of the substrate 14. The interdigital electrode 16 generally comprises a first plurality of spaced, generally parallel, electrically conductive, interconnected members or fingers 20 formed in a suitable manner on the surface of the substrate 14. Similarly, the interdigital electrode 18 generally comprises a second plurality of spaced, generally parallel, electrically conductive, interconnected members or fingers 22 formed on the surface of the substrate 14. The members or fingers 20 extend intermediate adjacent of the members or fingers 22 the center-to-center distance S between adjacent conductive members 20 and 22, i.e., the interdigital spacing, being no greater than one-half the acoustic wave length $\lambda$ of a surface wave in the crystal.

With the surface wave transducer structure illustrated in FIG. 1, a surface wave may be either generated or detected along the surface of the substrate 14 by either of the transducers 10 or 12. Thus, if a signal is applied between the electrodes 16 and 18 of the one transducer 10, a surface wave will be generated and will propagate along the surface of the substrate 14 in a direction perpendicular to the members or fingers 20 and 22. This surface wave may be detected and provided as an output signal between the electrodes of the transducer 12, the transducer 12 being employed as a detector or receiver.

It should, however, be noted that the transducers 10 and 12 of FIG. 1 are bi-directional and a 3 dB loss results in both launching and detecting acoustic surface waves with the illustrated transducers. This loss occurs at the transmitting or surface wave generating transducer because the acoustic wave energy divides with one half of the energy propagating each way along the transducer from approximately the center thereof. In other words, by virtue of the symmetry of the transmitting transducer, the acoustic radiation from each finger pair is identical in both directions.

At the output or receiving transducer, an additional 3 dB loss occurs when utilizing a bi-directional surface wave transducer such as that illustrated in FIG. 1. Of the incident surface wave energy at the receiving transducer, approximately half is detected and provided as an output signal and approximately one half is retransmitted bi-directionally. This retransmission results in an additional 3 dB loss so that the total loss through an acoustic device employing bi-directional transducers of the type illustrated in FIG. 1 is approximately 6 dB. Moreover, because of the energy retransmission, triple transit distortion typically results.

Figure 2:
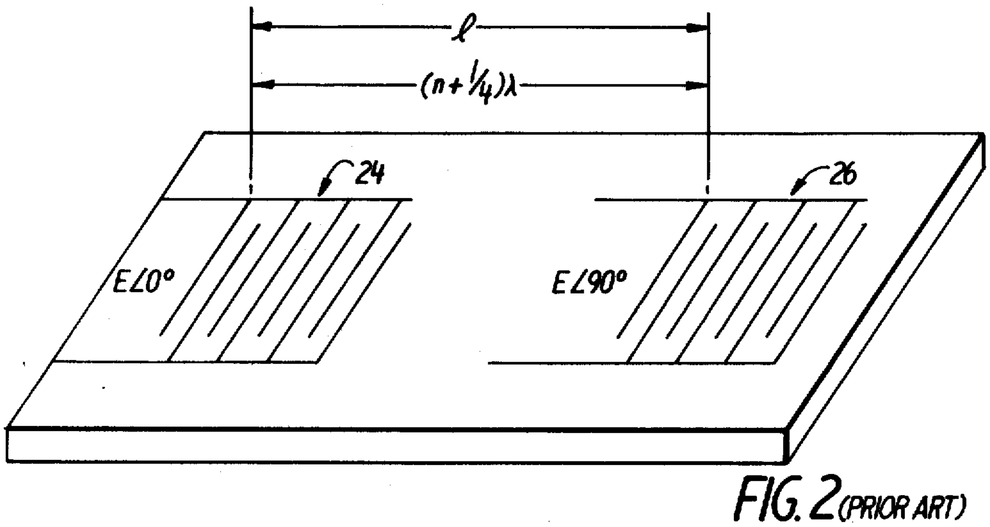
FIG. 2 (PRIOR ART)
FIG. 2 is a pictorial representation of a prior art unidirectional surface wave transducer.

A known arrangement for achieving unidirectional transduction of surface waves is illustrated in FIG. 2. Referring now to FIG. 2, a transducer having unidirectional characteristics may be formed on the surface of a substrate by employing two symmetrical interdigital transducers 24 and 26 of the type described in connection with FIG. 1. The transducers 24 and 26 are spaced along the path of travel of generated surface waves by an amount $l$ equal to an integral multiple of wavelengths plus one quarter wavelength, i.e., spaced by $(n + ¼)\lambda$ where $n$ is an integer and $\lambda$ is the acoustic wavelength of a surface wave.

The two spaced interdigital transducers 24 and 26 are connected, respectively, to a periodic input signal E and its quandrature phase, i.e., the input signal E shifted 90° in phase. Because of the phasing and the spacing $l$, the generated surface waves are reinforcing in one direction and cancelling in the other. With the transducer assembly illustrated in FIG. 2, the acoustic energy transmitted in the desired direction of phase support is the sum of that transmitted from both transducers. In the opposite direction complete cancellation occurs at frequencies close to the condition of $(n + ¼)\lambda$ spacing.

The limitations of the transducer assembly illustrated in the FIG. 2 are, as suggested, that the unidirectional transduction occurs only for frequencies close to the condition of $(n + ¼)\lambda$ spacing, i.e., for input signals having a wavelength close to the acoustic wavelength $\lambda$. The periodicity in the frequency domain for the transducer assembly of FIG. 2 is given by the equation $\Delta f = v/2l$. Thus, unidirectional transduction occurs at a frequency $f_0$ in the desired direction. At a frequency $f_0$ plus $f/2$, transduction occurs in the opposite direction.

This complete reversal of transmission at frequencies separated by one half a difference frequency $\Delta f$, which is dependent upon transducer spacing, results in a relatively narrow band transducer. This may be particularly undesirable in many surface wave acoustic filters and delay line applications.

While it may be possible to intersperse the two transducers of FIG. 2 to combine both phase components into one transducer, such an arrangement creates an impossible structural arrangement of the transducer electrodes. Since thin metal fingers or members from each of the transducer phases, i.e., both the zero degree and 90° phases, must be interspersed, a very large number of crossovers must be used. For frequencies in the VHF and higher frequency ranges for which finger spacing is on the order of 1 mil or less, an arrangement with a large number of crossovers becomes highly impractical, particularly since hundreds of fingers may be used in a single transducer. The combining of the transducers of FIG. 2 may thus be very difficult and quite expensive to implement.

Figure 3:
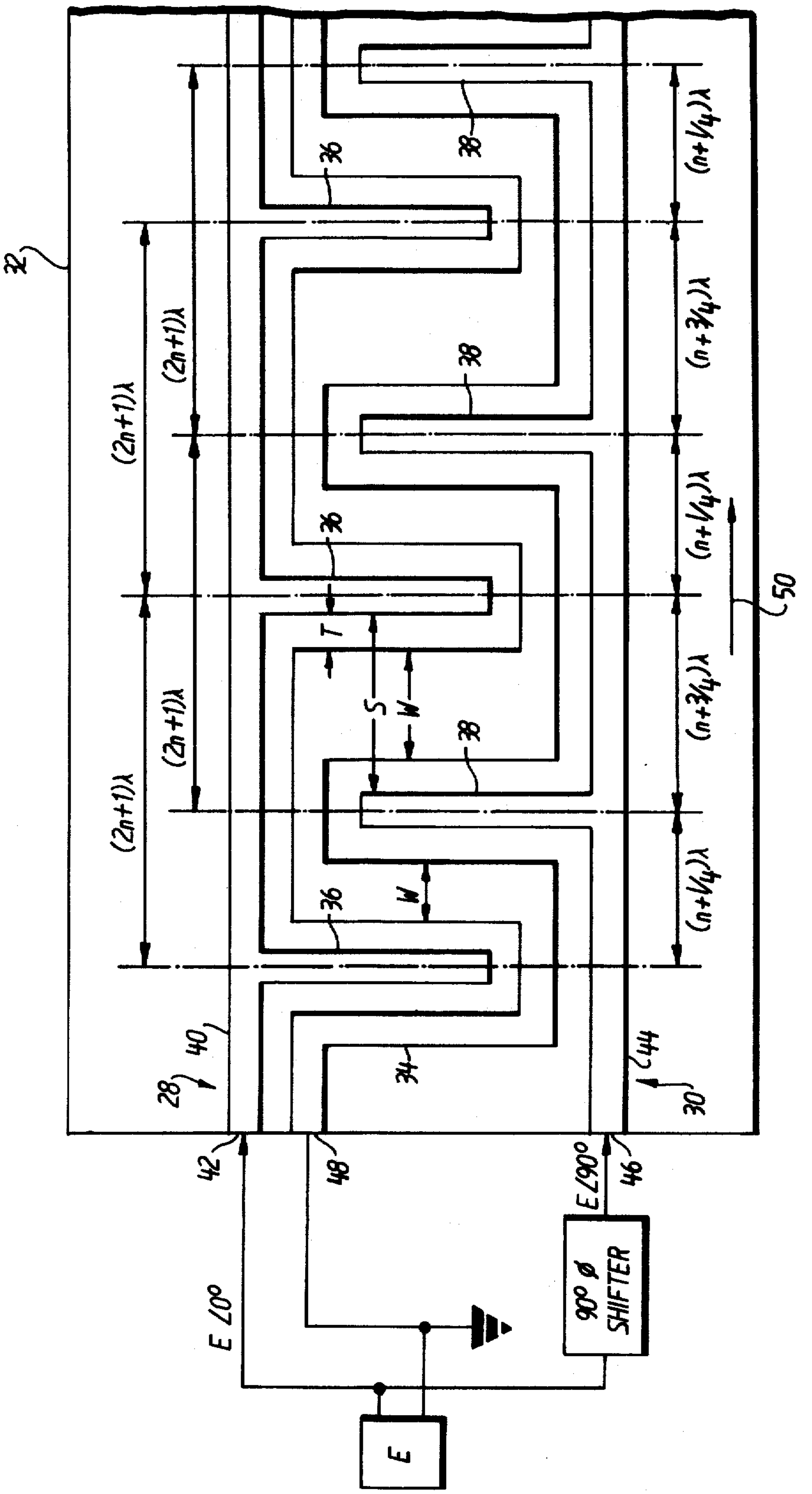
FIG. 3 is a plan view of the unidirectional transducer of the present invention.

The foregoing problems associated with the prior art are obviated through the implementation of a broadhand uni-directional transducer in accordance with the present invention. Referring now to FIG. 3 wherein a preferred embodiment of the transducer of the present invention is illustrated, two interdigital electrodes 28 and 30 are formed on the surface of a suitable acoustic wave substrate material 32 with an electrically conductive strip 34 spaced therefrom and meandering through the interdigital spaces S between the electrodes 28 and 30. More specifically, a first plurality of spaced, generally parallel, interconnected electrically conductive members or fingers 36 and a second plurality of spaced, generally parallel, interconnected, electrically conductive members or fingers 38 are carried on the surface of the substrate 32 with the electrically conductive strip 34 spaced from and meandering through the spaces S between the first and second plurality of members 36 and 38. The plurality of electrically conductive members or fingers 36 are positioned at spaced intervals on the surface of the substrate 32 normal to the direction of propagation of an acoustic surface wave. One end of each finger 36 is connected to a common conductive strip 40 which provides one input (or output) terminal 42. The fingers 36 and conductive strip 40 form the one interdigital electrode 28.

The other interdigital electrode 30 is similarly formed on the surface of the substrate 32 by the plurality of members or fingers 38 positioned at spaced intervals normal to the direction of propagation of an acoustic surface wave and extending into the spaces between adjacent fingers 36, i.e., arranged interdigitally with the fingers 36. An electrically conductive strip 44 interconnects each of the fingers 38 at one end thereof and forms another input (or output) terminal 46. The width of the fingers 36 and 38 may be, for example, on the order $¼\lambda$.

The electrically conductive strip 34 meandering through the interdigital array formed by the first and second plurality of members provides a common terminal 48 for each interdigital electrode. The conductive strip 34 preferably varies in width W in accordance with the variations in distance between adjacent fingers of the array so that approximately the same spacing T is maintained between the conductive strip 34, the fingers 36 and 38 and the strips 40 and 44. In the illustrated embodiment, this spacing T may be on the order of $¼\lambda$.

For proper phasing and resultant reinforcement and cancellation in the desired directions, adjacent interconnected fingers of each plurality of fingers 36 and 38 are preferably spaced by a center-to-center distance of $(2n + 1)\lambda$(where $n$ is an integer). The center-to-center spacing between adjacent of the fingers 36 and 38 of the first and second electrodes 28 and 30 (i.e., the interdigital spacing) is preferably $(n + ¼)\lambda$ and $(n + ¼)\lambda$ as illustrated in FIG. 3. This interdigital spacing may be defined by a repeating series $(n + ¼)\lambda$, $(n + ¼)\lambda$, $(n + ¼)\lambda$, $(n + ¾)\lambda$, . . . The electrically conductive strip 32 thus preferably varies in width W from $(n - ½)\lambda$ to $n\lambda$ to provide the desired uniform spacing previously described.

With the arrangement of FIG. 3, a signal E $\angle 0°$ and a signal E $\angle 90°$, e.g., a periodic signal E and the same signal E phase shifted 90°, may be applied between the respective terminals 42 and 46 and the common terminal 48 as illustrated. The application of these phased signals to the transducer results in the generation of a surface wave which propagates along the surface of the substrate 32 in a direction illustrated by the arrow 50. By reversing the phase relationship of the applied signals, a surface wave may be propagated in a direction opposite that shown by the arrow 50.

The operation of the broadband unidirectional transducer of FIG. 3 in generating a surface wave may be more clearly understood by considering the relative phasing of the first (i.e., the leftmost) few fingers 36 and 38. The signal E $\angle 0°$ initiates the propagation of a surface wave from the leftmost finger 36 toward the adjacent finger 38. Because of the interdigital spacing between the fingers of the two electrodes 28 and 30 and the relative phasing of the applied signals, the peak of the surface wave propagated from the finger 36 reaches the finger 38 at the peak of the signal E $\angle 90°$. The surface wave is thus reinforced, and the reinforced surface wave continues to propagate in the direction indicated at 50.

At the time the peak of the reinforced surface wave reaches the next finger 36, the applied signal is at a peak because of the integral wavelength spacing between the fingers 36. The reinforced surface wave is thus further reinforced.

A surface wave propagated by the second leftmost finger 36 in the direction opposite that indicated by the arrow 50 travels $(n + ¾)\lambda$ before reaching the adjacent finger 38. Because of this spacing and the relative phases of the applied signals, the positive peak of the surface wave reaches the finger 38 at a time when the signal E $\angle 90°$ is at a negative peak. The result is a cancellation of the surface wave propagated in the direction opposite that indicated by the arrow 50.

It might be thought that by virtue of the phase dispersive characteristics of the meander line formed by the common conductor 34, a phase shift would occur and limit the value of the transducer of FIG. 3. This might be true for exceedingly large transducers utilized to generate complex frequency characteristics. However, the meandering common electrode 34 can be utilized for most typical transducer applications without any appreciable phase shift.

For example, a typical transducer having 8 finger pairs each having a length of about 0.1 inches results in a common conductor 34 of approximately 1.6 inches in length. At 70 MHz which corresponds to an electromagnetic wavelength of greater than 10 feet, the 1.6 inch length of the common conductor 34 is negligable in phase shift. Thus, the geometry of the transducer illustrated in FIG. 3 provides unidirectional transmission for broadband transducers without appreciable phase shift in most applications.

Figure 4:
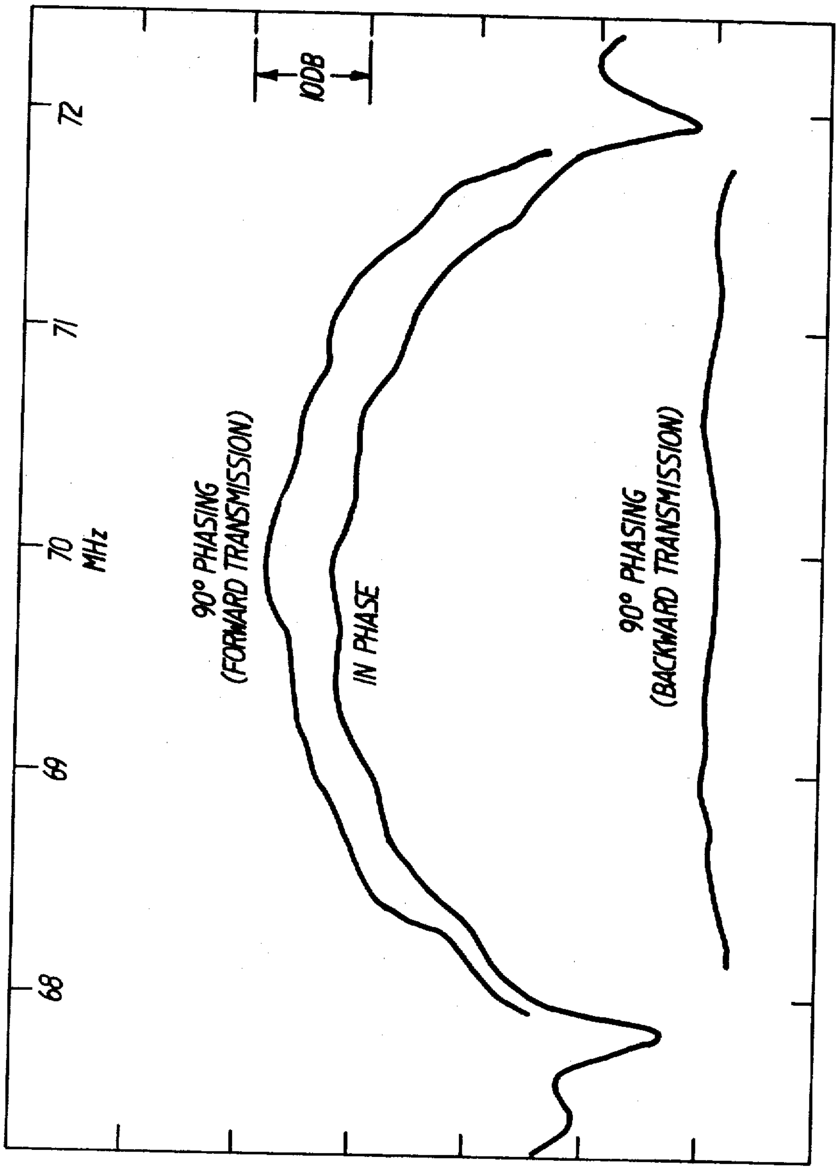
FIG. 4 illustrates data for a unidirectional surface wave transducer in accordance with the present invention; and, FIG. 5 is a pictorial representation of a surface wave acoustic device employing the unidirectional transducer of the present invention.

FIG. 4 illustrates various data for a broadband unidirectional surface wave transducer in accordance with the present invention. The data plotted in FIG. 4 represents measurements taken by adjusting a broadband unidirectional transducer according to the present invention to transmit both toward and away from a bidirectional transducer which serves as an acoustic probe. All data was obtained utilizing a commercially available Hewlett Packard network analyzer.

Referring to FIG. 4, the curve labeled "in phase" is a result achieved with the two interdigital electrodes of the transducer of the present invention excited in phase. Since the length of the composite unidirectional transducer is only one wavelength greater than the individual elements, this "in phase" curve is a good approximation of the bandpass of the individual elements and serves as a reference for evaluating the unidirectional transducer.

The other two curves of FIG. 4 are results obtained by exciting the two interdigital electrodes with signals having plus or minus 90° phase differences. This forward and reverse transmission data was taken point by point by adjusting for a 90° phase relationship, connecting the exciting signals to a directional transducer and then reversing the connection so that both maximum and minimum transmissions were measured at the acoustic probe.

Maximum or forward transmission (the upper curve of FIG. 4) varies across the bandpass "in phase" curve from approximately 1 to 6 dB. The minimum or backward transmission shown in the lower curve is approximately 40 dB below the maximum transmission at midband and maintains a relatively constant transmission level across the bandpass of the "in phase" curve. Clearly, the directional character of the transducer is maintained for the bandpass of the individual elements. This is a clear improvement over known bi-directional transducer assemblies.

Figure 5:
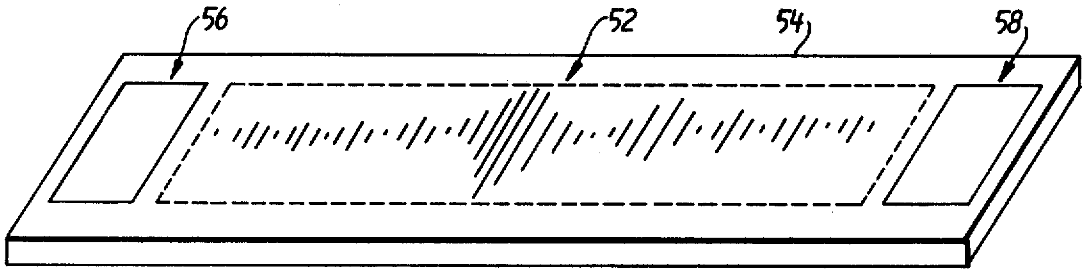

As will be apparent to one skilled in the art to which the invention pertains, the broadband unidirectional transducer of the present invention may be employed as both input and output transducer for broadband surface wave devices such as delay lines. In FIG. 5 there is illustrated a band shaping arrangement utilizing broadband unidirectional transducers of the present invention.

Referring now to FIG. 5, a highly sophisticated bidirectional band shaping transducer generally indicated at 52 may be formed in a conventional manner on the surface of a substrate 54. Two broadband unidirectional transducers 56 and 58 constructed in accordance with the present invention may be provided at opposite ends of the bi-directional band shaping transducer 52 at identical distances from the center of the band shaping transducer and in the propagation paths of the surface waves transmitted by the band shaping transducer. By using two unidirectional transducers, the bi-directional loss of the band shaping transducer 52 is eliminated since both halves of the propagated surface wave are intercepted by the two uni-directional transducers 56 and 58. Thus, the complete 6 dB bidirectional loss may be eliminated by using two unidirectional transducers in combination with a bidirectional band shaping transducer.

It can be seen from the foregoing that in accordance with the present invention it is now possible to fabricate broadband, unidirectional surface wave transducers and to employ such transducers in various surface wave devices without the usual 6 dB bi-directional loss and with increased triple transit echo suppression. For example, triple transit echo is suppressed at midband by the amount of the front to back ratio of the transducer which, as can be seen from FIG. 4, may be on the order of 40 dB or more.

The transducer according to the present invention may be readily fabricated utilizing known techniques and materials such as those described in U.S. Pat. No. 3,611,203 and may thus be manufactured relatively inexpensively. For example, the interdigital electrodes and meandering common electrode may be formed by conventional deposition and engraving or etching techniques on the surface of quartz crystal or other piezoelectric material.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A surface wave transducer comprising:

a substrate;

a first plurality of spaced, generally parallel, interconnected, electrically conductive members carried by said substrate;

a second plurality of spaced, generally parallel, interconnected, electrically conductive members carried by said substrate;

said first plurality of members extending intermediate at least some of said second plurality of members in spaced, generally parallel and coplanar relation thereto; and, a common terminal for each of said first and second plurality of members, said common terminal comprising a strip of electrically conductive material spaced from and meandering through the spaces between said first and second plurality of members, the center-to-center spacing between adjacent members of said first plurality of members and between adjacent members of said second plurality of members being substantially equal to an odd multiple of acoustic wavelength of the substrate material, and each of said first plurality of members extending intermediate said second plurality of members at locations displaced approximately one quarter an acoustic wavelength from a location disposed centrally of adjacent of the members of said second plurality of members.

2. The transducer of claim 1 wherein said strip of conductive material varies in width to accommodate differences in spacing between adjacent of said members.

3. A surface wave transducer comprising:

a substrate;

a first plurality of spaced, generally parallel, interconnected, electrically conductive members carried by said substrate;

a second plurality of spaced, generally parallel, interconnected, electrically conductive members carried by said substrate;

said first plurality of members extending intermediate at least some of said second plurality of members in spaced, generally parallel and coplanar relation thereto; and, a common terminal for each of said first and second plurality of members, said common terminal comprising a strip of electrically conductive material spaced from and meandering through the spaces between said first and second plurality of members, each of said first plurality of members extending intermediate said second plurality of members at locations displaced approximately one quarter an acoustic wavelength from a location disposed centrally of adjacent of the members of said second plurality of members.

4. The transducer of claim 3 wherein said strip of conductive material varies in width to accommodate differences in spacing between adjacent of said members.

5. A broadband unidirectional surface wave transducer comprising:

two interdigital electrodes formed on an acoustic wave material and having interdigital electrode spacing defined by a repeating series $(n + 1/4)\lambda$, $(n + 3/4)\lambda$, $(n + 1/4)\lambda$, $(n + 3/4)\lambda$, . . . where $n$ is an integer and $\lambda$ is an acoustic wavelength of said acoustic wave material; and, an electrically conductive strip spaced from and meandering through the interdigital spaces between said interdigital electrodes, said conductive strip forming a common terminal for each of the two interdigital electrodes.

6. The transducer of claim 5 wherein said conductive strip varies in width to provide substantially equally spacing between said conductive strip and said interdigital electrodes.

7. The transducer of claim 6 wherein the acoustic wave material is quartz.

8. The transducer of claim 6 wherein the integer $n$ is one.

9. The transducer of claim 5 wherein the acoustic material is quartz.

10. The transducer of claim 5 wherein the integer $n$ is one.

* * * * *